United States Patent [19]

Schenk

[11] Patent Number: 5,028,447
[45] Date of Patent: Jul. 2, 1991

[54] PROCESS FOR THE PREPARATION OF A WATER AND OIL EMULSION

[75] Inventor: Bert Schenk, Maassluis, Netherlands

[73] Assignee: Van den Bergh Foods Company, Division of Conopco, Inc., New York, N.Y.

[21] Appl. No.: 571,005

[22] Filed: Aug. 21, 1990

Related U.S. Application Data

[63] Continuation of Ser. No. 278,702, Dec. 1, 1988, abandoned.

[30] Foreign Application Priority Data

Dec. 3, 1987 [EP] European Pat. Off. ............. 8720399
Sep. 30, 1988 [EP] European Pat. Off. ......... 882021444

[51] Int. Cl.$^5$ .............................................. A23D 5/00
[52] U.S. Cl. .................................. 426/605; 426/607; 426/613
[58] Field of Search ................. 426/607, 605, 613, 47, 426/7

[56] References Cited

U.S. PATENT DOCUMENTS 4,107,335  8/1978  Glickstein et al. .
4,119,564  10/1978  Van Dam ............................ 426/605
4,612,197  9/1986  Postner .

FOREIGN PATENT DOCUMENTS 118753  5/1988  European Pat. Off. .
1525929  9/1978  United Kingdom .

Primary Examiner—Marianne Cintins
Attorney, Agent, or Firm—G. J. McGowan, Jr.

[57] ABSTRACT

Oil and water emulsions which contain a phospholipoprotein material whcih has been modified by phospholipase A, and at least one native starch based thickening agent, are prepared by subsequently gelatinizing the thickening agent, incorporating the modified phospholipoprotein containing material into the gelatinized thickening agent, then incorporating the oil (which may at least partially be replaced by a low-calorie fat substitute) and finally homogenizing the mixture obtained.

19 Claims, 1 Drawing Sheet

PROCESS FOR THE PREPARATION OF A WATER AND OIL EMULSION

This is a continuation application of Ser. No. 278,702, filed Dec. 1, 1988, now abandoned.

BACKGROUND OF THE INVENTION

The present invention relates to a process for the preparation of a water and oil emulsion comprising a phospholipoprotein containing material, which has been modified by phospholipase A, and at least one native starch based thickening agent. More particularly the invention relates to a process for the preparation of an oil-in-water emulsion of the mayonnaise, French dressing or salad dressing type.

There is an increasing demand for milder, preservative-free oil-in-water emulsion based products, which have not been subjected to severe heat treatments, but at the same time have an acceptable taste and good keeping properties. In order to prepare these products, the manufacturer faces a number of sometimes conflicting requirements. If the product has to be mild, the use of chemical preservatives to inhibit the growth of unacceptable microorganisms is almost unavoidable. If on the other hand the product should be free of these chemical preservatives, one has to resort to the use of such amounts of acid in order to arrive at an acceptable shelf life of the product, that the taste of the product is unacceptably harsh.

Mild products, which are free of chemical preservatives treatment, but upon heating above 60° C.-70° C., the egg yolk in oil-in-water emulsions looses its emulsifying properties, which results in coarsening of the emulsion, followed by oil exudation. Products based on milk protein instead of egg yolk as emulsifying agent are generally heat-stable at 60° C.-70° C., but lack the desired creamy taste impression originating from the egg yolk. With salad dressing an additional problem is met. Salad dressing resembles mayonnaise in that it is also an oil-in-water emulsion, but in addition to egg yolk it contains starch based thickening agents and gums. These thickeners usually are chemically modified starches, which however are expensive and moreover there is an increasing demand to have these chemically modified starches replaced by native starches. The use of native starches entails a number of difficulties, however, because they are more sensitive to temperature, time and shear conditions during gelatinization. Moreover during storage of the dressings prepared with native starches, gel formation (thickening) and as a consequence water separation (syneresis) often occurs due to retrogradation of the starch, leading to unacceptable products.

SUMMARY OF THE INVENTION

It has now been found that these disadvantages can be overcome by using a phospholipoprotein containing material, which has been modified by phospholipase A, and preparing the oil and water emulsion containing at least one native starch based thickening agent by using a specific sequence of operations.

The present invention therefore relates to a process for the preparation of a water and oil emulsion comprising a phospholipoprotein containing material, which has been modified by phospholipase A, and at least one native starch based thickening agent, which comprises:

(a) at least partially gelatinising the native starch based thickening agent,
(b) incorporating the phospholipoprotein containing material, which has been modified by phospholipase A, into the gelatinised native starch based thickening agent,
(c) incorporating the required amount of oil or fat containing oil into the mixture obtained in step (b), and
(d) homogenizing the final mixture obtained.

The emulsions prepared according to the invention preferably have the aqueous phase as the continuous phase and are in this specification referred to as oil-in-water emulsions. This type of emulsion means for the purpose of this specification continuous aqueous phases containing any amount of oil and fat containing oil in dispersed form. Examples of emulsions which come under this definition are edible products like mayonnaise, dressings, spreads, soups or sauces.

It is known from British Patent Specification 1,585,105 (Unilever) to prepare oil-in-water emulsions comprising hot- and cold-water-soluble, optionally modified, kinds of starch and gums and a phospholipoprotein material, modified by a treatment with phospholipase A. This publication is silent, however, on the occurrence of water separation of the products upon storage and with regard to the preparation of the emulsions it has only been stated that the emulsions are prepared by incorporating in the emulsion besides oil, water and modified phospholipoprotein, at least one thickening agent in a proportion, which is less than the proportion required for obtaining an emulsion of the same composition and viscosity, but containing unmodified or insufficiently modified phospholipoprotein. In the examples all the ingredients are mixed together in one vessel and from this publication it cannot be concluded that a specific sequence of operations in the preparation of the emulsion is necessary to arrive at an acceptable product not exhibiting water separation upon storage.

DETAILED DESCRIPTION OF THE INVENTION

Figure 1:
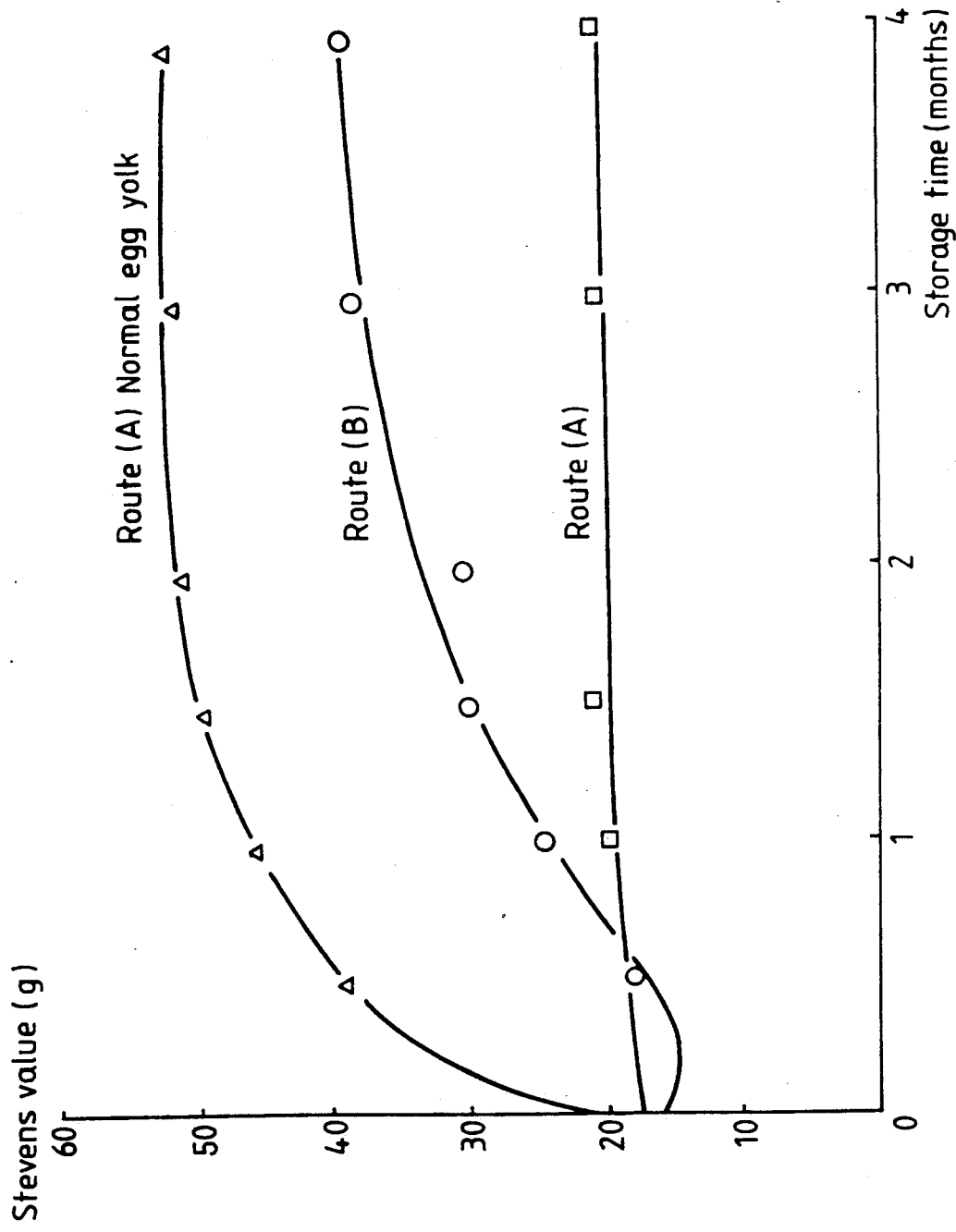

Preferred oil-in-water emulsions are emulsions containing from 5% to 85%, more preferably from 15 to 50% of oil or fat-containing oil. By fat we mean a triglyceride which is hard at room temperature (typically 15°-25° C.). With the process according to the invention oil-in-water emulsions can be prepared which are also stable at refrigeration temperature (4°-10° C.) using non-winterized oils. In general stable products can be prepared starting from a mixture of oil and hard fat in an amount (dependent on the type of the hard fat) of up to about 15% solid fat (based on the total oil phase) in the oil phase at 5° C.

The oil and the fat may be of vegetable or animal origin and may be synthetic oil and fat. It may be a single oil or fat or fat fraction or a mixture of oils or fats and/or fat fractions.

At least part of the oil and/or at least part of the fat may be replaced by a liquid or solid low-calorie fat-replacer respectively. Particularly suitable fat replacers are the edible polyesters of polyhydric alcohols having at least four free hydroxyl groups, such as polyglycerols, sugars or sugar alcohols, and saturated or unsaturated, straight or branched alkyl chain $C_8$–$C_{24}$ fatty acids. The polyhydric alcohol fatty acid polyesters include any such polyesters or mixtures thereof of which, on an average, at least 70% of the polyhydric alcohol hydroxyl groups have been esterified with the fatty acids. Also fatty alkyl ether derivatives of glycerol, esters of $C_8-C_{24}$ fatty alcohols and polycarboxylic acids, waxes and microcrystalline cellulose can be used for replacing at least part of the oil or the fat.

Examples of phospholipoprotein-containing materials are skim milk, butter milk, whey, cream, egg yolk and whole egg. Egg yolk is used preferably as source of the phospholipoprotein.

Egg yolk or other sources of phospholipoprotein can be subjected to the action of phospholipase A, particularly phospholipase $A_2$ and the modified product is then incorporated in the emulsions according to the invention according to the process of this invention.

The expression "modified" applied to phospholipoprotein as used herein denotes any degree of conversion brought about by the action of phospholipase A. Phospholipase A is an enzyme which effects cleavage of the bond which binds a fatty acid radical to the glycerol part of the phospholipid molecule, thereby replacing this fatty acid radical by a hydroxyl group, which is called conversion. Phospholipase A is also active when the phospholipid is complexed with protein (and then called phospholipoprotein in this specification).

A suitable source of phospholipase A is pancreatin which is preferably heat-treated, preferably under acidic conditions. The heat treatment is carried out at a temperature from 60° C. to 90° C. for 3-15 minutes preferably at pH from 4 to 6.5. The enzyme composition thus obtained is substantially free from enzymatic activity other than that resulting from phospholipase A, which is remarkably stable under the conditions of the above treatment.

The degree of conversion of modified phospholipoprotein is in this specification expressed as the percentage of converted phosphatidylcholine plus phosphatidylethanolamine based on the total amount of phosphatidylcholine plus phosphatidylethanolamine present before conversion. An easy method to obtain the figures required to compute this percentage is quantitative thin-layer chromatography.

Even a very low degree of conversion contributes to the emulsifying capacity of the phospholipoprotein modified by phospholipase A as well as to the heat stability of the emulsion containing it. The presence of unmodified phospholipoprotein is detrimental to the beneficial effects of the modified composition, without, however, totally off-setting these. Thus one would normally expect that replacing in an emulsion the entire modified phospholipoprotein content having a degree of conversion of, for example 40% by an equivalent amount of equal parts of unmodified phospholipoprotein and modified phospholipoprotein having a degree of conversion of 80%, would make no difference in the properties of the emulsion. It has been found, however, that the latter emulsion is appreciably less heat-stable than the former, although the latter emulsion is also appreciably better in this respect than an emulsion stabilized by an equivalent amount of unmodified phospholipoprotein.

The degree of conversion should at least be 10%. Preferred emulsions according to the invention are emulsions, in which the degree of conversion of the phospholipoprotein, modified by phospholipase A, contained therein is from 40% to 86%, especially from 40% to 65%.

The quantity of modified phospholipoprotein which should be present in the emulsion can vary within very wide limits. This quantity is inter alia dependent on the composition of the emulsion, the presence of other emulsifying agents, the degree of conversion of the phospholipoprotein modified by phospholipase A and the properties which are desired in the stabilized emulsion. In the present invention the emulsions contain from 0.05% to 5% of the phospholipoprotein modified by phospholipase A based on the oil (or fat-containing oil) content of the emulsion.

In a particular embodiment of the present invention emulsions are provided containing modified egg yolk which is substantially free of cholesterol.

In the emulsions to be prepared according to the present invention the native starch based thickening agent preferably is a hot-water soluble native starch, like corn starch, wheat starch, potato starch and the like, or a mixture of said starches. Also cold-water soluble starches may be used, which usually are pregelatinized. In case cold-water soluble starches are used in the process according to the present invention, the first step of the process, i.e. gelatinising the native starch based thickening agent may be superfluous and in that case the phospholipoprotein containing material, which has been modified by phospholipase A, can be incorporated immediately into the pregelatinized native starch based thickening agent (process step (b)), after which the other process steps (c) and (d) according to the present invention are performed.

Generally from 0.1% to 10% by weight of the final emulsion of native starch based thickening agent is used, optionally conjointly with from 0.05% to 1% by weight of at least one gum, like guar gum, locust bean gum, and the like.

In the process according to the present invention the sequence of process steps is essential to arrive at shelf-stable products.

The hot-water soluble native starch based thickening agent is first subjected to a gelatinising treatment by heating it to a temperature between 75° C. and 90° C. in the presence of water, the temperature being dependent on the type of the thickening agent used, the pH and the presence of any other additives.

The hot-water soluble native starch based thickening agent may subsequently be cooled, but it may also be transferred in hot state to a mixing vessel, during which transfer a small temperature drop may occur. The hot-water soluble native starch based thickening agent before gelatinising and, optionally cooling may have been mixed with vinegar, salt, sugar, vegetables, herbs, spices and the like.

Then the phospholipoprotein containing material, which has been modified by phospholipase A, is incorporated into the gelatinised native starch based thickening agent. This is followed by incorporating the required amount of oil or fat containing oil, and any other ingredients of the emulsion, after which the final mixture obtained is homogenized.

The emulsions to be prepared according to the present invention may also comprise vinegar, lime or lemon juice, edible acids, up to 6% by weight (based on the total emulsion) of ethanol, sweetening agents, salt, mustard, herbs, spices, flavoring agents, vegetable particles, emulsifying agents, coloring agents, gums and stabilizers, but the amount and the type of these additives should be such that the obtained emulsions will be mild and substantially preservative-free.

The invention is illustrated by the following examples.

EXAMPLE I

A salad dressing having the following composition (in weight percentages):

| | |
|---|---|
| Soybean oil | 25.0 |
| Modified egg yolk | 2.5 |
| Vinegar (10%) | 6.7 |
| Native maize starch | 3.5 |
| Sugar | 5.5 |
| Salt | 1.92 |
| Water | 54.88 | in which the egg yolk was modified with phospholipase A to a degree of conversion of 80%, was prepared in two ways:

(A) The maize starch was gelatinised by heating to 90° C. with the water, sugar and salt under gentle stirring and after a holding time of 10 minutes the starch phase was cooled down to 25° C. Subsequently the vinegar, the modified egg yolk and the oil were added (in this sequence) while stirring and the obtained mixture was homogenised in a colloid mill.

(B) After having prepared the cooled starch phase as under (A) the vinegar, the modified egg yolk and the oil were mixed and the mixture was separately emulsified and homogenised. This homogenised emulsion of vinegar, modified egg yolk and oil was subsequently mixed with the cooled starch phase.

The samples of product as prepared via route (A) and via route (B) were stored at 15° C. and visually assessed for their storage stability, particularly paying attention to gel formation (so-called after-gelling) and water separation. The texture of the products was measured with the Stevens Texture Analyser (using grid no. 6, speed 1 mm/sec and penetration depth 2.5 cm). The results of the texture investigation have been depicted in FIG. 1. In this figure also the behavior of the texture upon storage of a similar product has been depicted, which product had the same composition, the modified egg yolk, however, being replaced by normal native egg yolk. For the preparation of this product also route (A) was followed.

In the product samples prepared via route (A), which is according to the process of the present invention, no visual product instability was observed during storage (up to 4 months), but it was observed that with the products prepared via route (B) the instability could only be delayed for a few weeks. After this period after-gelling started, later followed by water separation.

The product with normal, non-modified egg yolk prepared by the process according to the present invention showed after-gelling within a short time, later followed by water separation.

These results clearly demonstrate that only if the heat processed and cooled native starch based thickening agent is first mixed with the egg yolk, modified by treatment with phospholipase A, followed by the addition of the oil or the oil containing fat, an ambient stable pourable salad dressing with a creamy taste could be obtained.

EXAMPLE II

A salad dressing having the following composition (in weight percentages):

| | |
|---|---|
| Soybean oil | 35.0% |
| Modified egg yolk | 4.5% |
| Vinegar (7.5%) | 4.5% |
| Native wheat starch | 5.6% |
| Guar gum | 0.1% |
| Sugar | 1.75% |
| Salt | 0.5% |
| Water | 48.05% | in which the egg yolk was modified with phospholipase A to a degree of conversion of 70%, was prepared by gelatinising the native wheat starch together with the guar gum, the salt, the sugar, the vinegar and the water by heating these components together to 85° C. under gentle stirring. The mixture obtained was hold 10 minutes at 85° C. under stirring and was subsequently pumped to a mixing vessel in which it was mixed under stirring with the modified egg yolk and finally the oil was added and the final mixture was homogenized in a colloid mill, upon which a mild dressing (pH=4.1) without preservatives was obtained, which after filling into glass jars and upon storage at 15° C. for 12 months showed no after-gelling or water separation and had a constant Stevens value of 20–22 (measured under the same conditions as in Example I).

What is claimed is:

1. A method of preparing a water and oil emulsion including from 5% to 85% by weight based on the final emulsion of oil and including from 0.05% to 5% by weight, based on the oil content of the final emulsion, of a phospholipoprotein containing material, which has been modified to a degree of conversion of at least 10% by phospholipase A, and from 0.1% to 10% by weight, based on the final emulsion, of at least one native starch based thickening agent, comprising in the following order:
   a) at least partly gelatinizing the native starch based thickening agent by heating it to a temperature between 75° C. and 90° C. in the presence of water,
   b) then incorporating the phospholipoprotein containing material, which has been modified by phospholipase A, into the gelatinized native starch based thickening agent,
   c) subsequently incorporating the required amount of oil, or fat containing oil, into the mixture obtained in step (b) and,
   d) finally homogenizing the final mixture obtained.

2. A process according to claim 1, in which the emulsion is an oil-in-water emulsion.

3. A process according to claim 1, in which the phospholipoprotein containing material is selected from the group consisting of whole egg, egg yolk, and egg yolk substantially free from cholesterol.

4. A process according to claim 1, in which substantially all of the phospholipoprotein has been subjected to the treatment with phospholipase A.

5. A process according to claim 1, in which the degree of conversion of the phospholipoprotein by the phospholipase A is from 40% to 86%.

6. A process according to claim 1, in which the degree of conversion of the phospholipoprotein by the phospholipase A is from 40% to 65%.

7. A process according to claim 1, in which the phospholipase A is phospholipase A2.

8. A process according to claim 1, in which from 15% to 50% by weight of oil is used.

9. A process according to claim 1, in which up to 15% of hard fat is used, based on the weight of the oil phase of the emulsion.

10. A process according to claim 9 in which at least part of the hard fat is replaced by a solid low-calorie fat replacer.

11. A process according to claim 10, in which the low-calorie fat-replacer is selected from the group consisting of polyesters of polyhydric alcohols having at least four free hydroxyl groups of which on an average at least 70% have been esterified with saturated or unsaturated, straight or branched alkyl chain $C_{8-24}$ fatty acids, fatty alkyl ether derivatives of glycerol; esters of $C_{8-24}$ fatty alcohols and polycarboxylic acids; waxes; microcrystalline cellulose; and mixtures thereof.

12. A process according to claim 1, in which at least part of the oil is replaced by a liquid low-calorie fat replacer.

13. A process according to claim 12, in which the low-calorie fat-replacer is selected from the group consisting of polyesters of polyhydric alcohols having at least four free hydroxyl groups of which on an average of at least 70% have been esterified with saturated or unsaturated, straight or branched alkyl chain $C_8$–$C_{24}$ fatty acids, fatty alkyl ether derivatives of glycerol; esters of $C_8$–$C_{24}$ fatty alcohols and polycarboxylic acids; waxes; microcrystalline cellulose, and mixtures thereof.

14. A process according to claim 1, in which the native starch based thickening agent is a hot-water soluble native starch.

15. A process according to claim 1, in which the native starch based thickening agent is selected from the group consisting of corn starch, wheat starch, potato starch, and mixtures thereof.

16. A process according to claim 1, in which from 0.05% to 1% by weight of the final emulsion mixture of at least one gum is used.

17. A process according to claim 15, in which the gum is guar gum.

18. A process according to claim 1, in which the final emulsion obtained is heated to a temperature between 60° C. and 90° C.

19. A process according to claim 18, in which the emulsion is heated for 1 to 10 minutes.

* * * * *